(12) United States Patent
Golding et al.

(10) Patent No.: US 7,698,459 B2
(45) Date of Patent: Apr. 13, 2010

(54) METHOD AND SYSTEM FOR IDENTIFYING A DEVICE ADDRESS

(75) Inventors: John M. Golding, Naperville, IL (US); John J. Bieker, Plainfield, IL (US); Brian K. Solomon, Mokena, IL (US)

(73) Assignee: Tellabs Operations, Inc., Naperville, IL (US)

( * ) Notice: Subject to any disclaimer, the term of this patent is extended or adjusted under 35 U.S.C. 154(b) by 889 days.

(21) Appl. No.: 11/384,234

(22) Filed: Mar. 16, 2006

(65) Prior Publication Data

US 2007/0220167 A1 Sep. 20, 2007

(51) Int. Cl.
*G05F 15/173* (2006.01)

(52) U.S. Cl. .................. 709/238; 709/227; 709/228; 709/237; 709/229; 370/254; 370/347

(58) Field of Classification Search ......... 709/227–229, 709/237–238; 370/254, 347
See application file for complete search history.

(56) References Cited

U.S. PATENT DOCUMENTS

| | | | | |
|---|---|---|---|---|
| 5,664,107 | A * | 9/1997 | Chatwani et al. ............ | 709/224 |
| 6,088,730 | A * | 7/2000 | Kato et al. .................. | 709/227 |
| 6,195,712 | B1 * | 2/2001 | Pawlowski et al. ........... | 710/19 |
| 6,308,227 | B1 * | 10/2001 | Kumar et al. .................. | 710/4 |
| 6,327,252 | B1 * | 12/2001 | Silton et al. ................. | 370/256 |
| 6,456,624 | B1 * | 9/2002 | Eccles et al. ................ | 370/400 |
| 6,697,884 | B1 * | 2/2004 | Katsch ........................ | 710/18 |
| 6,839,755 | B1 * | 1/2005 | Kumpf et al. ............... | 709/225 |
| 6,888,802 | B1 * | 5/2005 | Golikeri et al. ............ | 370/254 |
| 7,075,895 | B1 * | 7/2006 | Hanam ........................ | 370/254 |
| 7,173,934 | B2 * | 2/2007 | Lapuh et al. ................. | 370/392 |
| 7,283,476 | B2 * | 10/2007 | Bare ........................... | 370/236 |
| 7,349,981 | B2 * | 3/2008 | Guerrero .................... | 709/238 |
| 2002/0197956 | A1 * | 12/2002 | Annola et al. ................ | 455/41 |
| 2003/0076809 | A1 * | 4/2003 | Basil et al. ................... | 370/346 |
| 2004/0066281 | A1 * | 4/2004 | Hughes et al. ............. | 340/10.2 |

OTHER PUBLICATIONS

The I²C-Bus Specification, Version 2.1, *Phillips Semiconductors*, Jan. 2000.

* cited by examiner

*Primary Examiner*—Alina N. Boutah
(74) *Attorney, Agent, or Firm*—Hamilton, Brook, Smith & Reynolds, P.C.

(57) ABSTRACT

A method is disclosed for identifying a device address of a destination device having a device address unknown to a source device. The method may include sending a communication, with a hunt address in place of a known destination address, from a source device to a destination device having a device address unknown to the source device. The method may further include using the hunt address as a known destination address in future communications, if an acknowledgement responsive to the communication is received by the source device. The method may further include selecting a next hunt address from a set of device addresses to use as the hunt address and iteratively sending communications with hunt addresses from the source device to the destination device until the device address of the destination device is determined through an acknowledgement responsive to a communication or hunt addresses are exhausted, if the acknowledgment is not received by the source device.

25 Claims, 7 Drawing Sheets

| Bit | 7 | 6 | 5 | 4 | 3 | 2 | 1 | 0 |
|---|---|---|---|---|---|---|---|---|
| Address Register | A7 | A6 | A5 | A4 | A3 | A2 | A1 | Found |
| Reset Value | | | Most Likely Address Bits | | | | | 0 |
| Access | R/W* | R/W* | R/W* | R/W* | R/W* | R/W* | R/W* | R |

{ Potential Register Definition: rows Address Register, Reset Value, Access }

300

*FW writes allowed only when "ack_error" = 1 and "found" = 0

| ack_error | Found | Phase |
|---|---|---|
| 0 | 0 | HW Hunt |
| 0 | 1 | Locked |
| 1 | 0 | FW Hunt |
| 1 | 1 | Locked |

Under HW Control

FIG. 5B

METHOD AND SYSTEM FOR IDENTIFYING A DEVICE ADDRESS

BACKGROUND OF THE INVENTION

Electronic equipment often employs several functional devices that communicate with each other. In many interfaces between two devices, a control device stores and uses a device address for the other device in order to properly send communications. Devices typically have device addresses unique to the device function, model, or vendor/supplier.

SUMMARY OF THE INVENTION

A method is disclosed for identifying a device address of a destination device having a device address unknown to a source device. The method may include sending a communication, with a hunt address in place of a known destination address, from a source device to a destination device having a device address unknown to the source device. The method may further include using the hunt address as a known destination address in future communications, if an acknowledgement responsive to the communication is received by the source device. The method may further include selecting a next hunt address from a set of device addresses to use as the hunt address and iteratively sending communications with hunt addresses from the source device to the destination device until the device address of the destination device is determined through an acknowledgement responsive to a communication or hunt addresses are exhausted, if the acknowledgment is not received by the source device.

A system is disclosed for identifying a device address of a destination device having a device address unknown to a source device. The system may include a memory storing a set of device addresses. The system may further include a hunt unit configured to send communications in an iterative manner with a hunt address in place of a known destination address, from a source device to a destination device having a device address unknown to a source device, until the device address of the destination device is determined through an acknowledgement responsive to a communication or hunt addresses are exhausted. The system may further include a selection unit configured to select a next hunt address from the set of device addresses to use as the hunt address if an acknowledgement is not received by the source device. The system may further include a transmission unit configured to use the hunt address as a known destination address in future communications if an acknowledgement responsive to the communication is received by the source device from the destination device.

BRIEF DESCRIPTION OF THE DRAWINGS

The foregoing will be apparent from the following more particular description of exemplary embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of exemplary embodiments of the invention follows.

In some instances, equipment or a hardware module may include an open socket for which a device may be "plugged-in." The plugged-in device may provide a specialized function within the module and operate as a "slave" node in communication with a control device that operates as the "master" node. The master and slave nodes communicate over an interface, such as an Inter-Integrated Circuit ($I^2C$) bus. In order to establish communications between the master device and the slave device, the master device requires an address of the slave device to initiate communications. These device addresses may be dependent on the function of the device, the device model, or the particular vendor/original equipment manufacturer (OEM) supplier.

According to an exemplary embodiment of the invention, a system or corresponding method automatically identifies a device address of a destination device having an unknown device address. The embodiment may allow for manufacturing a module capable of accepting a "plugged-in" device by allowing the module to interchangeably support different devices having respective, different device addresses, typically due to differences in device function, model, or vendor for a given socket.

Figure 1A:
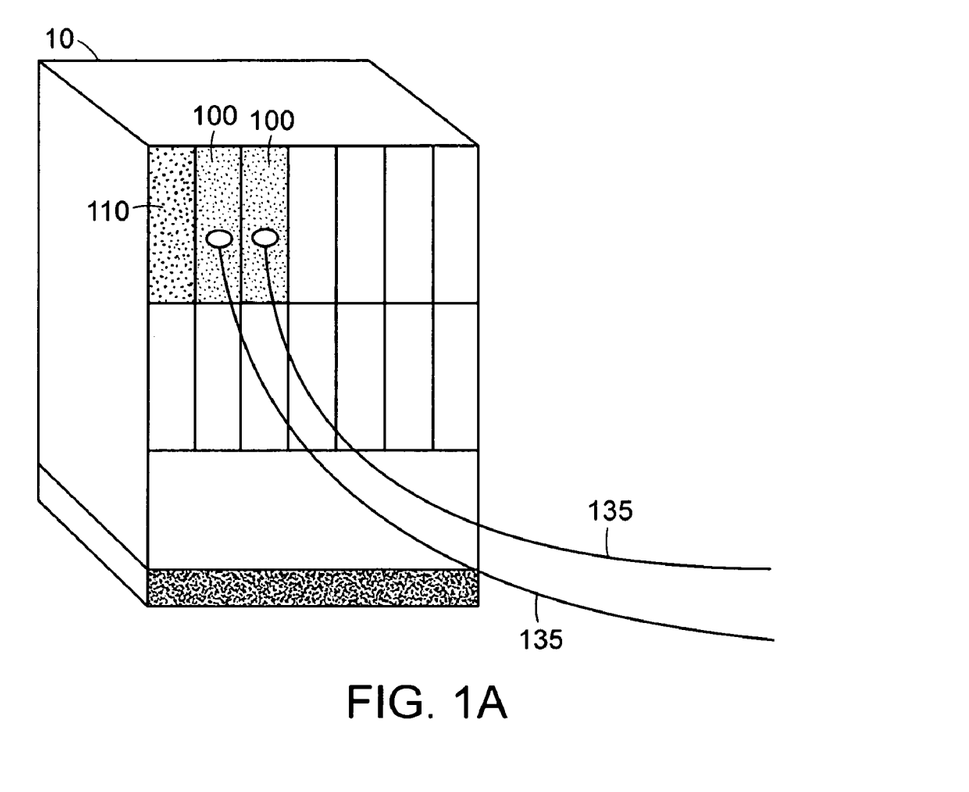
FIG. 1A is an exemplary system in which a device module of an exemplary embodiment of the invention may be employed.

FIG. 1A illustrates a system shelf 10 in which an exemplary embodiment of the invention may be applied. The system shelf 10 houses multiple modules 100, such as communication cards. In the system shelf 10 of FIG. 1A, modules 100 are connected to a system shelf controller 110 through a backplane (not shown). Fiber optic cables 135 allow the system shelf 10 to communicate with other devices (not shown) either directly or through a network.

Figure 1B:
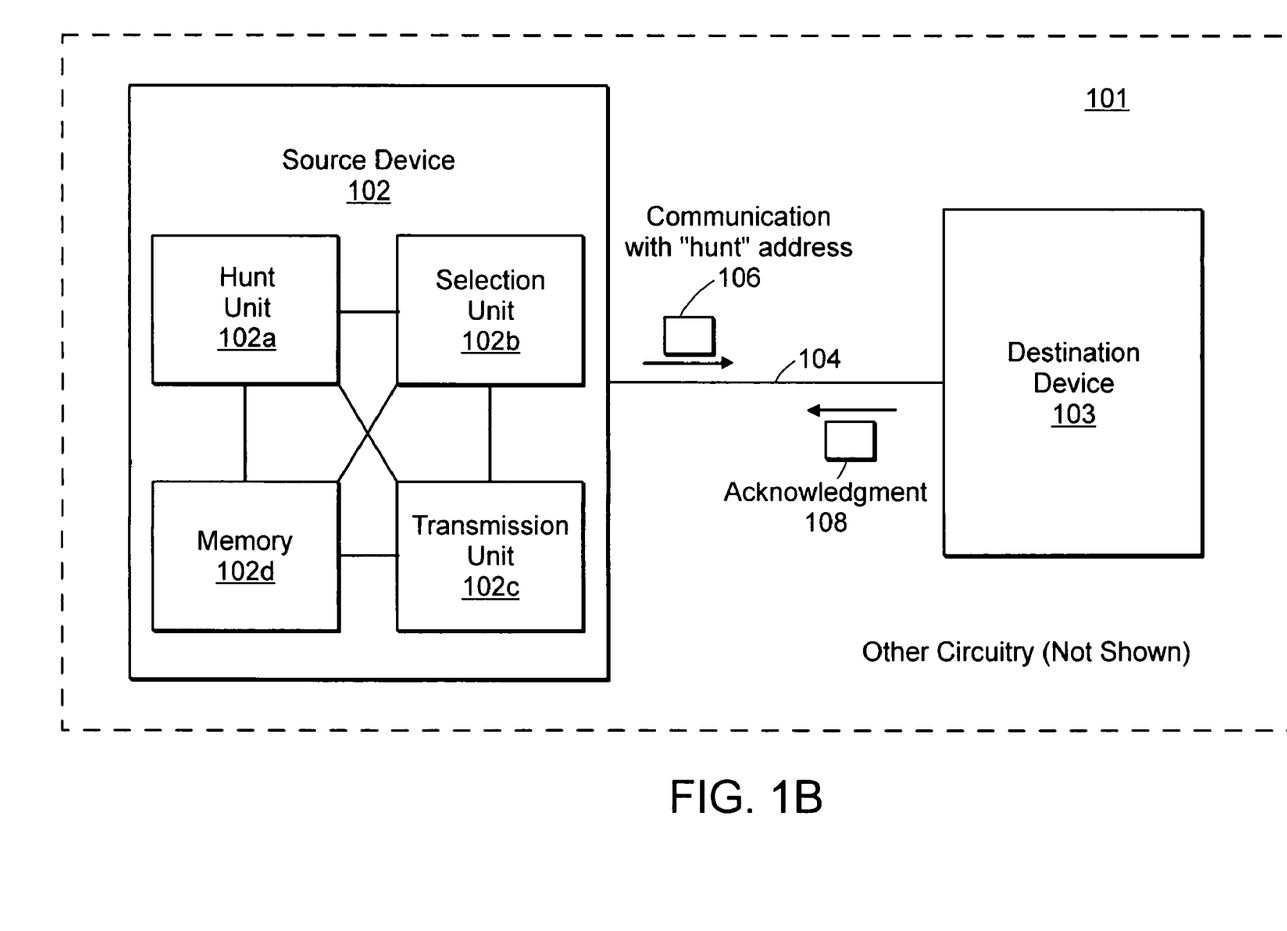
FIG. 1B is a representative diagram of a device module of an exemplary embodiment of the invention.

FIG. 1B is representative diagram that illustrates a representative device module 101 of an exemplary embodiment of the invention. Device module 101 may be a single circuit board that includes a source device 102 in communication with a destination device 103. In an exemplary embodiment of the invention, the source device 102 may communicate with destination device 103 over a single bus 104 using, as an example, an Inter-Integrated Circuit ($I^2C$) interface. The source device 102 may include several units that serve different functions. Among these units are a hunt unit 102a, a selection unit 102b, a transmission unit 102c, and a memory 102d. The hunt unit 102a may be configured to send communications 106 with a hunt address, in place of a known destination address, from a source device interface to a destination device interface having a device address unknown to a source device 102. If an acknowledgment 108 is not received by the source device 102, the selection unit 102b may select a next hunt address from a set of device addresses to use as the hunt address, and the hunt unit 102a may attempt to send a communication 106 with the new hunt address to the destination device 103. Memory 102d may be used to store the set of device addresses used by the selection unit 102b. However, if an acknowledgement responsive to the communication is received by the source device 102 from the destination device 103, transmission unit 102c may use the hunt address as a known destination address in future communications. The units and memory may reside on a single processor, such as a Field Programmable Gate Array (FPGA), or may reside of any combination of processors and memory, in exemplary embodiments of the invention.

The first set of device addresses may include a set of most likely device addresses most likely to cause the destination device to return an acknowledgement.

The example embodiment may select a next hunt address from the set of device addresses based on a probability of success of the new address in establishing a connection. The selection of the next hunt address from the first set of device addresses may occur at a high speed. The selection of the next hunt address from the second set of device addresses may occur at a slower speed.

Figure 1C:
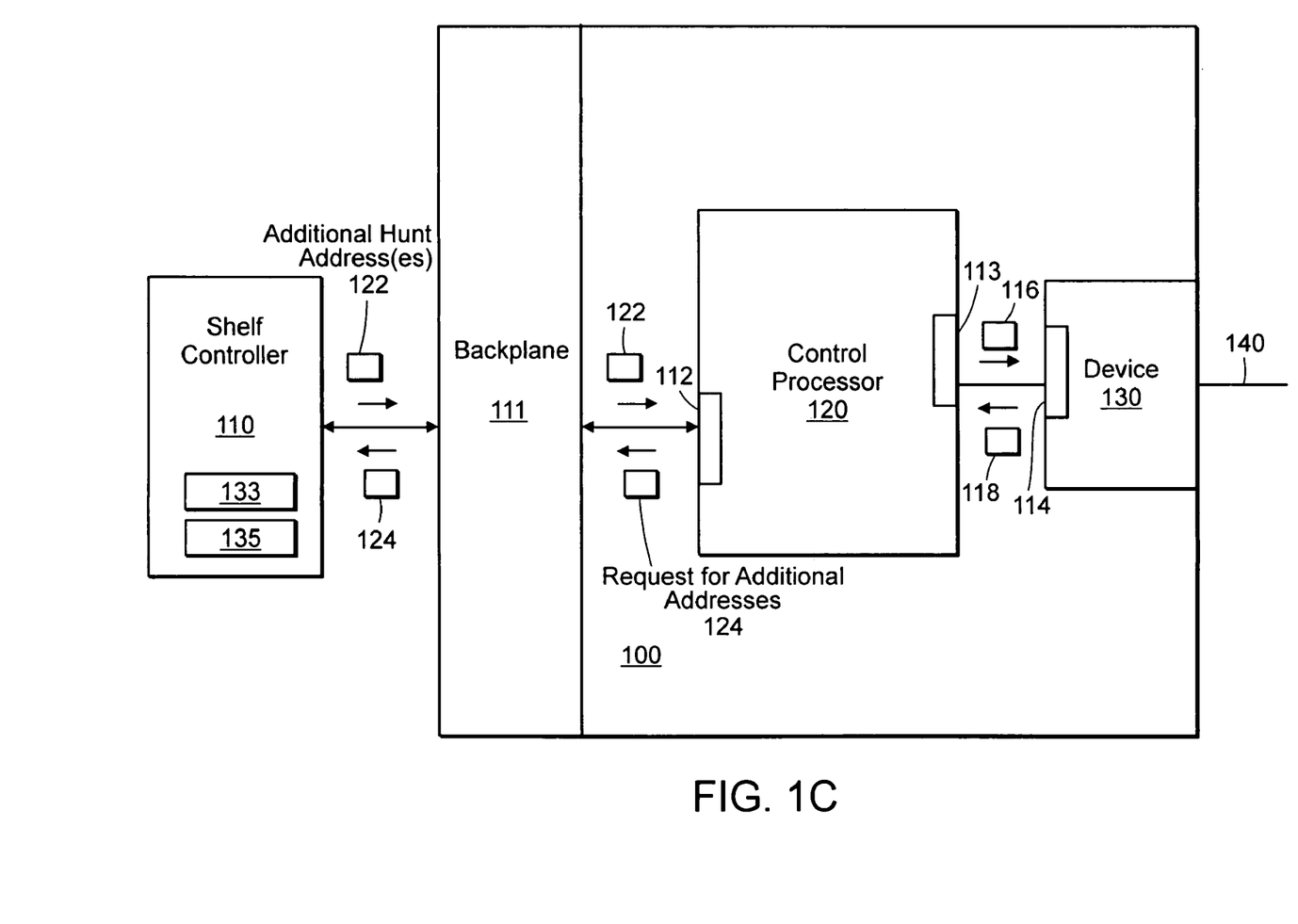
FIG. 1C is a representative diagram of a device module of another exemplary embodiment of the invention.

FIG. 1C illustrates a module 100 in which an exemplary embodiment of the invention may be applied. The module 100 includes a control processor 120, such as a FPGA, that communicates over an interface 113 with an interface 114 of another device 130. The control processor 120 may be configured to send communications 116 with a hunt address, in place of a known destination address, to the device 130. An acknowledgment 118 may be sent from the device 130 to the control processor 120 when the hunt address matches the device address of the device 130.

The control processor 120 may have an interface 112 with a backplane 111. The backplane 111 may allow the module 100 to communicate with a shelf controller 110 that may control at least some of the module functions. In such instances, the shelf controller 110 may provide commands through the control processor 120 to the device 130.

In an exemplary embodiment of the invention, the shelf controller 110 may also have a remote memory 133 and/or an address generator 135. The shelf controller 110 may provide the control processor with additional hunt addresses 122 through the backplane 111 connection. In an exemplary embodiment, the shelf controller 110 may provide one or more additional hunt address(es) 122 in response to a request 124 from the control processor 120. Either remote memory 133 or address generator 135 may provide additional hunt addresses. Remote memory 133 may be used to store additional hunt addresses. Address generator 135 may generate new potential device addresses for use as a hunt address.

An optical fiber trunk 140 may provide device 130 with a link to other devices (not shown). In an exemplary embodiment of the invention, both the control processor 120 and device 130 are located on a single circuit board. However, in another exemplary embodiment, the control processor 120 and the device 130 may be located on separate circuit boards linked via a network bus. Further, in another embodiment (not shown), the control processor 120 may communicate with multiple devices over multiple connections or over a single shared bus.

Figure 2:
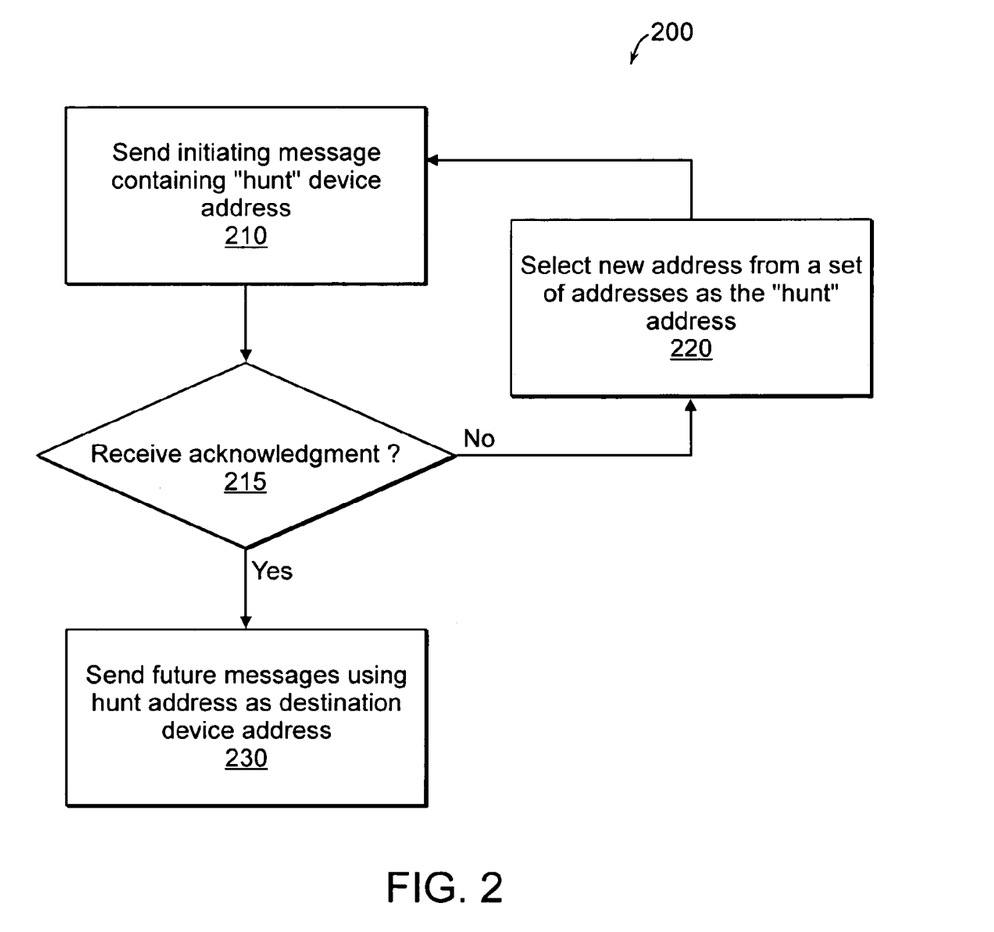
FIG. 2 is a flow chart illustrating the identification of a device address of a destination device having a device address unknown to a source device, according to an exemplary embodiment of the invention.
Figure 4:
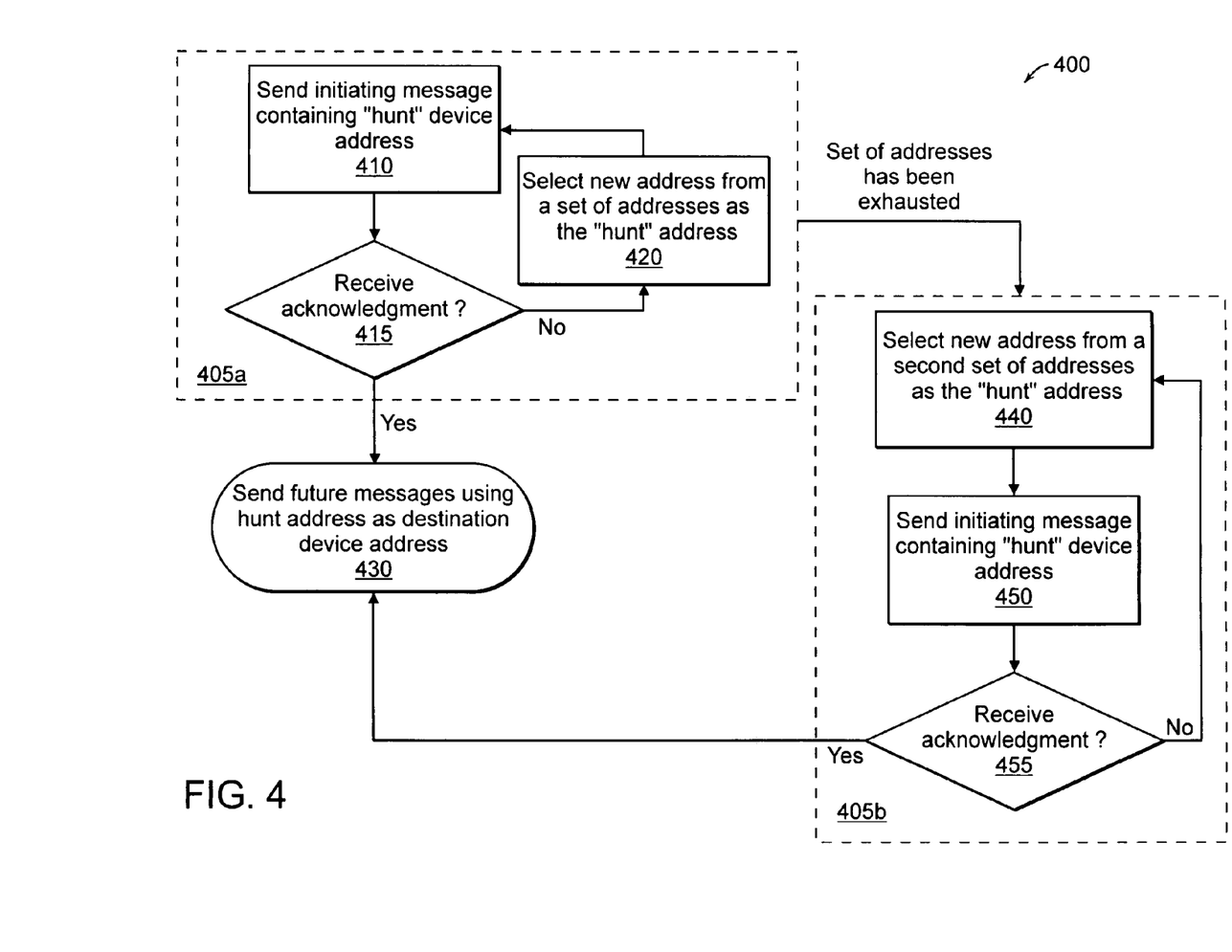
FIG. 4 is a flow chart illustrating the identification of a device address of a destination device having a device address unknown to a source device, according to an exemplary embodiment of the invention.

FIGS. 2 and 4 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

FIG. 2 is a flow chart that illustrates a method 200 for device address identification according to an exemplary embodiment of the invention. The method may be used by a source device and a destination device, such as control processor 120 and device 130 in FIG. 1C. At 210, an initiating message containing the "hunt" device address is sent from the source device to the destination device. Optionally, the destination device may provide an acknowledgment if it is properly addressed. (In an interface protocol between two devices, such as an Inter-Integrated Circuit ($I^2C$) interface, this acknowledgement may be provided.) If the sent hunt address correctly matches with the device address of the destination device, the destination device sends an acknowledgement message to back to the source device. Having sent a hunt address, at 215, the source device waits for an acknowledgement. If an acknowledgement arrives, at 230, the source device "locks on" (i.e., keeps record of in some manner) to the hunt address as a destination device address for sending future messages. If the source device does not receive an acknowledgement, at 220, a new device address from a set of addresses is selected to use as a new hunt address.

In an exemplary embodiment, once a connection has been made between a control processor and a destination device, the control processor may reset the device address of the destination device to a pre-determined address in order to standardize device addresses used in connection with a module (such as in the module 100 of FIG. 1C). In another exemplary embodiment, once the hunt address is identified as the proper destination device address, it may be useful to store the hunt address in a memory for future use.

Figure 3:
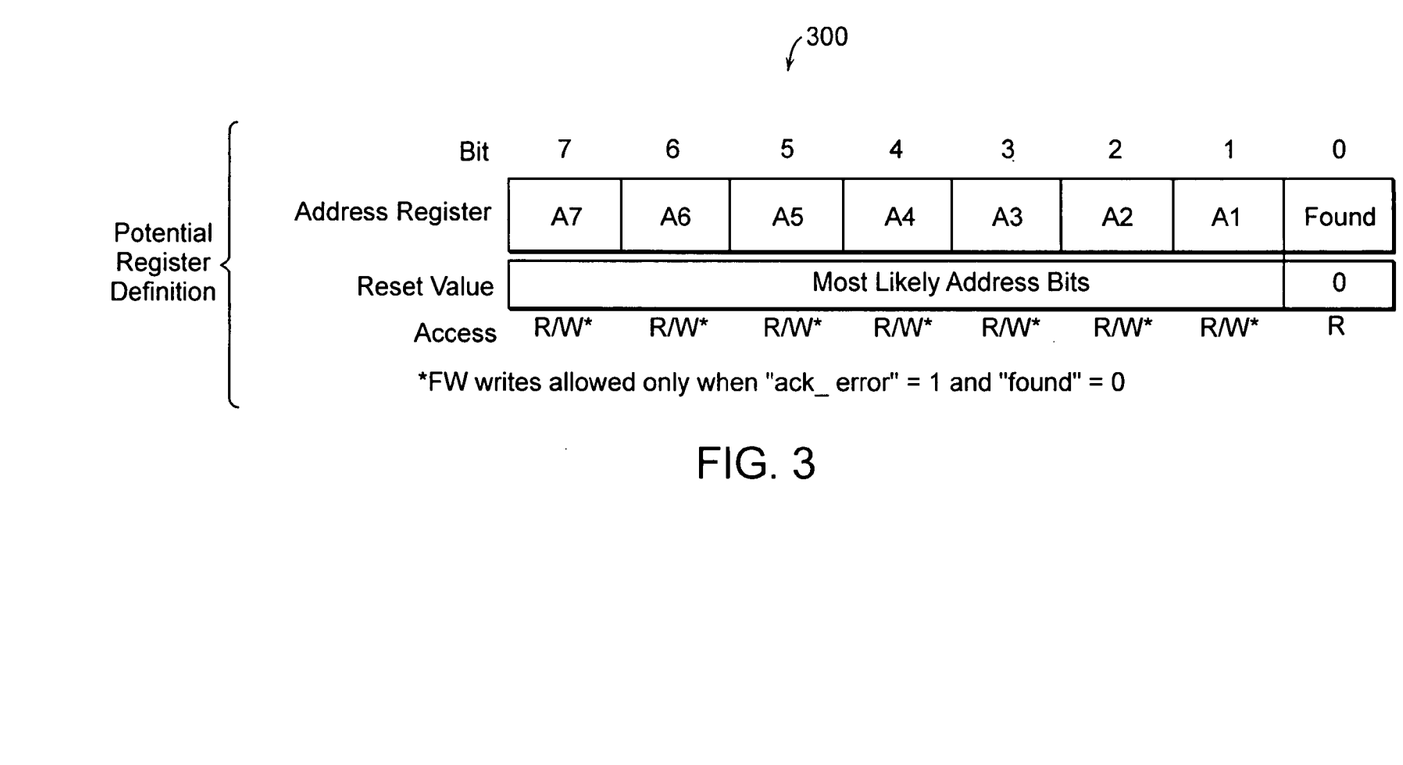
FIG. 3 is an exemplary register used in connection with an exemplary embodiment of the invention.

FIG. 3 illustrates a register 300 (in this particular exemplary embodiment, an 8-bit register), that may be used in connection with an exemplary embodiment of the invention. A source device (such as the control processor 120 of FIG. 1C) may have a set of addresses from which it may search. In this embodiment register 300 tracks a number of seven bit addresses that may reside in the source device, indicated by the seven bits A1-A7 in the register. Various combinations of the seven bits may result in 128 unique addresses. The source device may be programmed to send each of the addresses in the set to a destination device (such as the device 130 of FIG. 1C). The register may hold the address used as the current hunt address, and an eighth bit in the register 300, in particular an 8-bit register, may serve as a "found bit" to flag the case where a particular device address corresponding to the address bits A1-A7 has been successful in a hunt. The register may retrieve addresses either stored directly in a source device or from an auxiliary device (such as the shelf controller 110 of FIG. 1C). In some embodiments, a source may store a subset of the addresses (e.g. four or five frequently used addresses), leaving the remaining (e.g. non-frequent) addresses for storage in an auxiliary device. If an acknowledgement is received back at a the source device, the source device may indicate that the destination device address has been found by writing to the found bit in the register, thus locking the particular address for future communications.

In an exemplary embodiment, the addresses may be ordered in a manner such that a device address that is more likely to exist (e.g., based on frequency of use of a particular plug-in device) may be first accessed in the hunt process. As a result, a search through the addresses may be faster and communications between the source device and the destination device may be established more quickly.

FIG. 4 is a flow chart illustrating another exemplary embodiment method 400 for device address identification, where the search for the destination device address is performed in two phases: a first address list search phase 405a and a second address list search phase 405b. The method may be used by a source device and a destination device, such as control processor 120 and device 130 in FIG. 1C. At 410, the source device sends an initiating message containing the "hunt" device address to the destination device. If the sent hunt address correctly matches with the device address of the destination device, the destination device sends an acknowledgement message to back to the source device. Having sent a hunt address, at 415, the control processor waits for an acknowledgement. If an acknowledgment arrives, at 430, the source device locks on to the hunt address as a destination device address for sending future messages. If the source device does not receive an acknowledgement, at 420, the source device selects a new device address from a set of addresses to use as a next hunt address. When performed in a hardware exemplary embodiment, this first search phase may be referred to as a "hardware hunt" 405a.

At some point, the source device may exhaust its list of potential device addresses prior to identifying the proper destination device address. If the first set of addresses is exhausted, a second search phase 405b begins, wherein the source device accesses a second set of device addresses and at 440 selects a hunt address from that second set. At 450, the hunt address selected from the second set of device addresses is sent to the destination device. If at 455 the source device has received an acknowledgement, at 430 the source device at locks the hunt address as the destination device address for future communications. If at 455 the source device does not receive the acknowledgment, at 440 a next address is selected from the second set of hunt address, with the process of sending hunt addresses continuing until an acknowledgement is received or the possible addresses are exhausted.

In an exemplary embodiment of the invention, the second set of device addresses may reside remotely in some computer readable medium accessed through an auxiliary device (such as shelf controller 110 in FIG. 1A or 1C) in communications with the source device (through for example a backplane (such as 111 in FIG. 1C). The computer readable medium may be a read-only memory device, such as a CD ROM disk or conventional ROM devices, or a random access memory, such as a hard drive device or a computer diskette. The computer readable medium may also be a computer writable medium, allowing for dynamic programming of potential device addresses should new ones become available (e.g., new vendor modules with addresses different from those known to the source device). Because this second search phase may be performed in software or firmware, in embodiments of the invention, this second search phase may be referred to as a "software hunt" or a "firmware hunt" phase 405b. By dividing the search into two phases (e.g. the first search in hardware and the second search in firmware or software), frequently used device addresses may be stored (e.g. in hardware) for quick identification, and a larger number of less frequently used device addresses may be stored (e.g. in software), providing a balance of identification speed and flexibility.

Figure 5A:
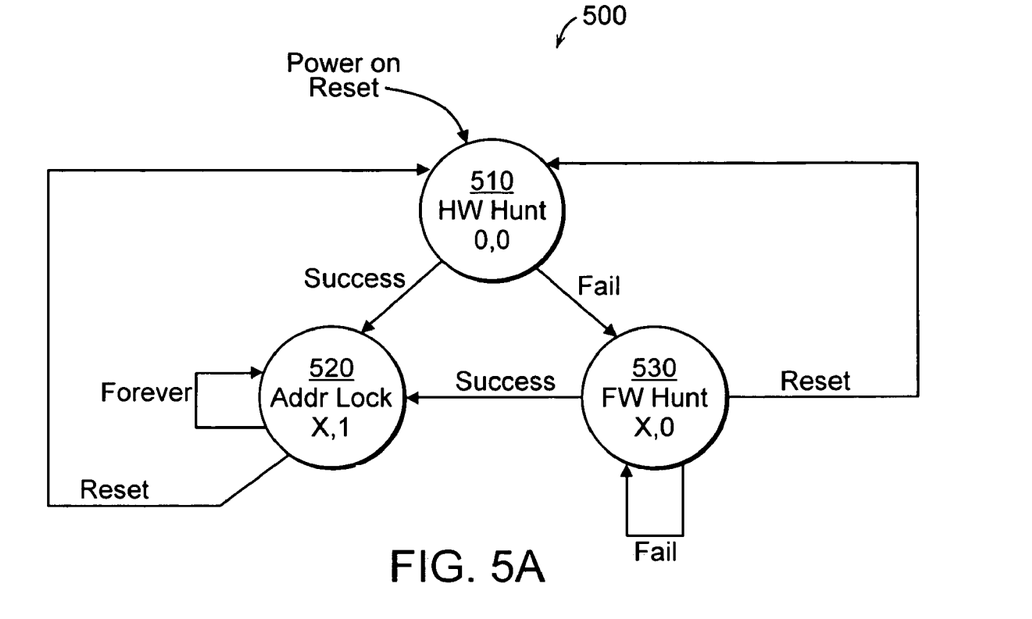
FIG. 5A is a block diagram illustrating a state machine for identifying a device address as performed in an exemplary embodiment of the invention.
Figure 5B:
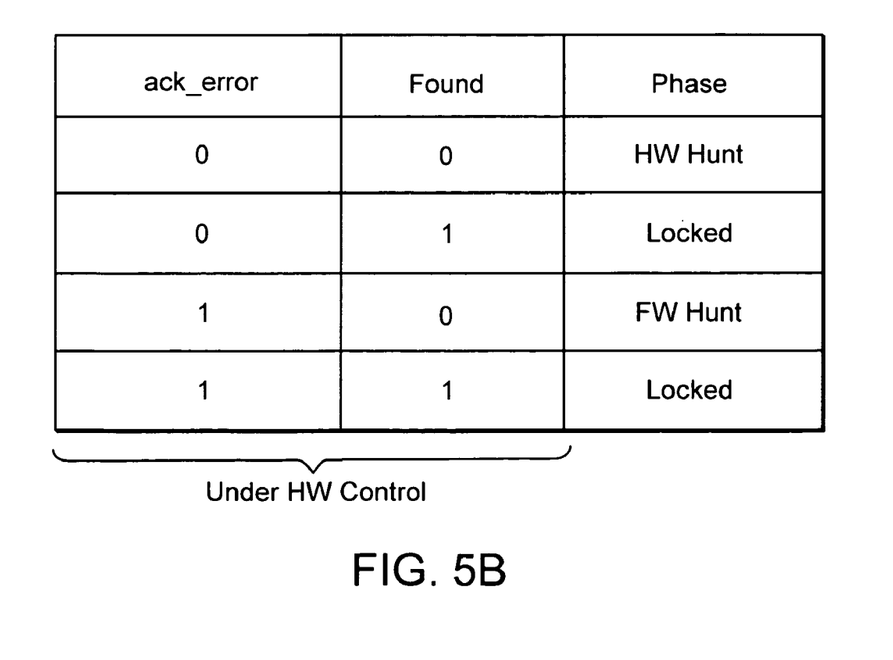
FIG. 5B is an exemplary embodiment table illustrating various states of the state machine in FIG. 5A.

FIG. 5A illustrates a state machine 500 and FIG. 5B is a corresponding table of states, for an exemplary embodiment of the invention. The states in the machines are defined by two variables, an acknowledgement error ("ack_error") and the successful identification of a destination device address ("found").

With reference to FIG. 5A, as a module (such as the module 100 of FIG. 1C) having a source device starts up or is reset, the state machine of the module begins in a hardware hunt phase ("HW Hunt") 510. In the hardware hunt phase, the state machine begins with an "ack_error" bit set at "0" to indicate that the hardware has not yet received any errors in receiving an acknowledgement from a destination device. Similarly, the "found" bit is set at "0" to indicate that the hardware has not yet found the correct destination device address.

If the hardware hunt 510 successfully identifies the destination device address, the "found" bit is set to "1," and the hunt address is locked (i.e., remembered) as the destination device address, causing the state machine to enter an "address lock" state 520. However, if the hardware hunt 510 exhausts its list of potential device addresses and thus fails to identify the destination device address, the "ack_error" bit is set to "1," and the state machine enters a software hunt/firmware hunt phase ("FW Hunt") 530. The software hunt phase 530 continues to search for the proper destination device address until one is found. Once the software hunt phase successfully identifies the destination device address, the "found" bit is set to "1," and the hunt address is locked as the destination device address, causing the state machine to enter an "address lock" state 520. The state machine may be reset to a hardware hunt state 510 while either in the "address lock" state 520 or the software hunt state 530.

While this invention has been particularly shown and described with references to exemplary embodiments thereof, it will be understood by those skilled in the art that various changes in form and details may be made therein, such as in a computer program product or software, hardware or any combination thereof, without departing from the scope of the invention encompassed by the appended claims.

Furthermore, it will be apparent to those of ordinary skill in the art that methods involved in the invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

What is claimed is:

1. A method for identifying a destination device address, the method comprising:
    sending a communication, with a hunt address in place of a known destination address, from a source device to a destination device having a device address unknown to the source device;
    using the hunt address as a known destination address in future communications, if an acknowledgement responsive to the communication is received by the source device; and
    selecting a next hunt address from a set of device addresses to use as the hunt address and iteratively sending communications with hunt addresses from the source device to the destination device until the device address of the destination device is determined through an acknowledgement responsive to a communication or hunt addresses are exhausted, if the acknowledgment is not received by the source device.

2. A method of claim 1 wherein using the hunt address includes storing the hunt address as a destination device address in a memory.

3. A method of claim 1 further comprising selecting a next hunt address from a second set of device addresses if hunt addresses are exhausted from the first set of device addresses.

4. A method of claim 3 wherein the first set of device addresses includes a set of most likely device addresses most likely to cause the destination device to return an acknowledgement.

5. A method of claim 3 wherein selecting a next hunt address from the set of device addresses is weighted based on a probability of success of the new address in establishing a connection.

6. A method of claim 3 wherein selecting the next hunt address from the first set of device addresses occurs at a high speed, and wherein selecting the next hunt address from the second set of device addresses occurs a slower speed.

7. A method of claim 3 wherein selecting the next hunt address from the first set of device addresses is performed in hardware and wherein selecting the next hunt address from the second set of device addresses is performed in software or firmware.

8. A method of claim 7 wherein the hardware is located on the source device and the software is located on a remote device.

9. A method of claim 1 further comprising reprogramming the device address of the destination device to a predetermined address.

10. A method of claim 1 wherein the source device and the destination device are connected via a shared bus.

11. A method of claim 1 wherein the source device and the destination device are connected via an Inter-Integrated Circuit (I²C) interface.

12. A method of claim 1 wherein the source device and the destination device are located on a single circuit board.

13. A system for identifying a destination device address comprising:
   memory storing a set of device addresses;
   a hunt unit configured to send communications in an iterative manner with a hunt address in place of a known destination address, from a source device to a destination device having a device address unknown to a source device, until the device address of the destination device is determined through an acknowledgement responsive to a communication or hunt addresses are exhausted;
   a selection unit configured to select a next hunt address from the set of device addresses to use as the hunt address if an acknowledgement is not received by the source device; and
   a transmission unit configured to use the hunt address as a known destination address in future communications if an acknowledgement responsive to the communication is received by the source device from the destination device.

14. A system of claim 13 further comprising a second memory configured to store the hunt address and provide the hunt address as the destination device address for the future communications.

15. A system of claim 13 further comprising a remote memory in communication with the selection module, the remote memory containing a second set of device addresses; and wherein the selection module is further configured to select a next hunt address from the second set of device addresses.

16. A system of claim 15 wherein the first set of device addresses includes a set of addresses most likely device address to cause the destination device to return an acknowledgment.

17. A system of claim 15 wherein the system further includes a processor, and wherein the hunt unit, the selection unit and the transmission unit are processor readable instructions readable and executable by the processor.

18. A system of claim 17 wherein the processor includes a Field Programmable Gate Array (FPGA).

19. A system of claim 18 wherein the memory is located on the FPGA.

20. A system of claim 19 wherein the remote memory is a computer readable and writable medium.

21. A system of claim 20 wherein the second memory is a register.

22. A system of claim 17 wherein the processor is connected to a destination device via a shared bus.

23. A system of claim 22 wherein the shared bus is an Inter-Integrated Circuit (I²C) interface.

24. A system of claim 13 wherein the transmission unit includes or is in communication with a reprogram unit configured to reprogram the device address of the destination device to a predetermined address different from the address to which the destination device acknowledged.

25. A system of claim 13 wherein the source device and the destination device are located on a single circuit board.

* * * * *